Patented Aug. 9, 1932

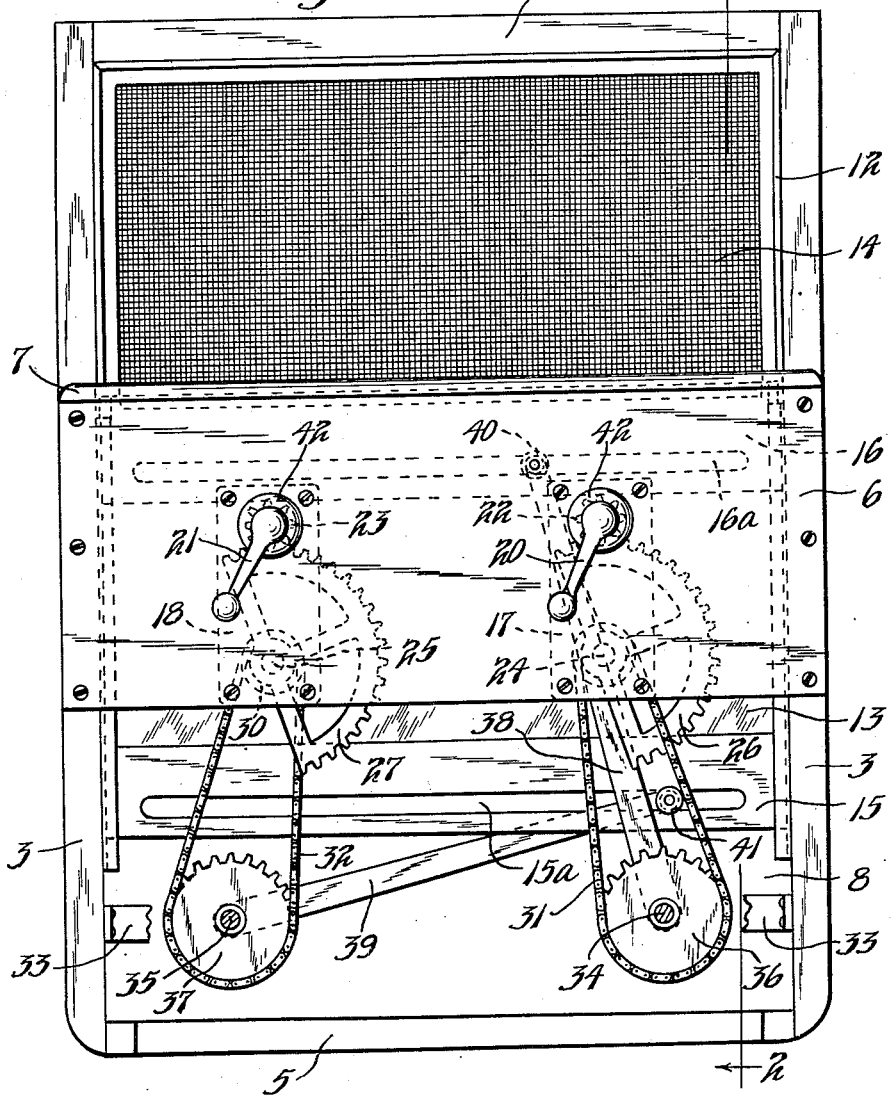

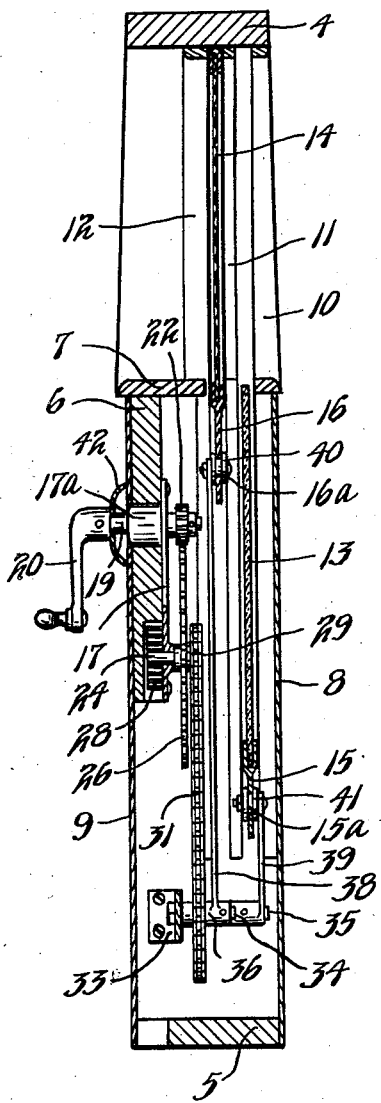

1,870,400

UNITED STATES PATENT OFFICE

CARL W. BUTTERFASS, OF YOUNG AMERICA, MINNESOTA, ASSIGNOR OF ONE-HALF TO EDWARD WILLIAMSON, OF BONGARD, MINNESOTA

COMBINATION SCREEN AND WINDOW CONSTRUCTION FOR VEHICLES

Application filed July 16, 1931. Serial No. 551,095.

This invention relates to screens particularly adapted for use on automobiles and other vehicles and to combination screen and window constructions for vehicles.

At the present time, most closed automobiles include window panes which can be raised to extend across window openings in door frames and side frames of the automobiles and can be lowered below the window openings in these door frames and side frames. It is desirable to provide these door frames and side frames with screens that can be extended across the window openings at times and can be lowered below the window openings.

It is the main object of the present invention to provide a novel and improved combination screen and window construction particularly adapted for use in vehicles, such as closed automobiles, and which construction incorporates therein simple and readily installable means for efficiently raising and lowering both the window pane and the screen without interference one with the other.

To this end, generally stated, the invention consists in the novel parts and novel combinations of parts hereinafter defined in the claim and described in the following specification, made in connection with the accompanying drawings, wherein one embodiment of the invention is illustrated and wherein like reference characters refer to the same or similar parts throughout the various views and, in which, Fig. 1 is a view in side elevation of an automobile door frame constructed in accordance with the present invention, the view being taken looking toward the inner side of the door frame with the inner panel of the door frame removed; and Fig. 2 is a vertical section taken on the line 2—2 of Fig. 1, as indicated by the arrows.

Referring to the drawings, portions of a door frame for enclosed automobiles are illustrated and this door frame, in accordance with the usual construction, includes jambs 3, an upper stretcher 4, a lower stretcher 5, a cross bar 6 located in spaced relation below the upper stretcher 4, and considerably above the lower stretcher 5 and a sill 7 mounted on the upper edge of the cross bar and defining, with the upper stretcher 4 and jambs 3, a window opening. An outer panel 8 constructed usually of metal, is secured to the two jambs 3 and the lower stretcher 5 and this panel rises to approximately the level of the upper edge of the cross bar 6. An inner panel 9 constructed usually of cardboard, leather or metal is also secured to the jambs 3 and rises from the lower end of the door frame to the sill 7 and fits over the cross bar 6. Outer strips 10, intermediate strips 11 and inner strips 12 secured to the jambs 6 and upper stretcher 4 form vertical guideways and in the guideway formed between the strips 10 and 11, there is mounted, in accordance with the usual practice, a glass window pane 13, while in the guideway formed by the strips 11 and 12 there is mounted, in accordance with the invention, a screen 14. The pane 13 has a cross bar 15 applied to its lower edge in the usual manner and this cross bar has a substantially horizontally disposed elongated slot 15a therein. The ends of the cross bar 15, of course, ride in the guideway formed between the strips 10 and 11. The screen 14 consists of a sheet of wire screening mounted in a suitable frame to fit the window opening, the said frame having a cross bar portion 16 at its lower edge within which a substantially horizontally disposed elongated slot 16a is formed.

A pair of plates 17 and 18 respectively, are applied to the outer side of the cross bar 6 in longitudinally spaced relation and these plates are similarly constructed and each has extending inwardly therefrom adjacent its upper end, a casing such as the casing 17a illustrated in Fig. 2, which fits inwardly into a recess cut in the cross bar 6. Short horizontal shafts such as the shaft 19 illustrated in Fig. 2, project inwardly through the panel 9 from each casing and secured respectively to the inner end of these shafts are hand cranks 20 and 21. Shafts project outwardly from the respective casings as 17a and these shafts carry respective pinions 22 and 23. As the mechanism enclosed in the casings such as the casing 17a are of standard construction and as this construction is immaterial to the present invention, it is thought unnecessary to describe the same here. Suffice it to say that as the respective hand cranks 20 and 21 are turned the respective pinions 22 and 23 will be rotated.

Journaled within hubs adjacent the lower ends of the plates 17 and 18 are short shafts 24 and 25 carrying segment gears 26 and 27 respectively. The gear 24 meshes with the pinion 22, while the gear 25 meshes with the pinion 23. Secured at one end to the shaft 24 and at its other end to the plate 17, is a coiled spring 28 of the watchspring type which exerts tension to urge shaft 24 to turn in a clockwise direction as viewed in Fig. 1. A similar spring is applied to the shaft 25 and to the plate 18, but this spring tends to urge shaft 25 to turn in a counter clockwise direction as viewed in Fig. 1. The spring 28 and the other spring similar to it fit within recesses cut in the outer side of the cross bar 6 inwardly from the plates 17 and 18. The two shafts 24 and 25 carry small sprockets 29 and 30 respectively over which sprocket chains 31 and 32 respectively run. A suitable cross bar 33 is secured to the two jambs 3 adjacent the lower ends of the same and this cross bar has a pair of shafts 34 and 35 respectively of different lengths journaled therein adjacent the ends of the bar. The shaft 34 is shorter than shaft 35 so that it projects outwardly from the bar 33 less distance than does the shaft 35 and this shaft 34 carries quite a large sprocket 36 over which the sprocket chain 31 runs. The shaft 35 carries a similar sprocket 37 over which the sprocket chain 32 runs. Shaft 34 has quite a long arm 38 secured thereto adjacent its outer end, while shaft 35 has a similar arm 39 secured thereto adjacent its outer end. By reason of the different lengths of the two shafts 34 and 35, the arm 38 will be spaced inwardly from the arm 39. The arm 38 carries at its upper end an outwardly extending stud upon which a grooved roller 40 is journaled and this grooved roller works within the elongated slot 16a in the bar portion 16 of the screen 14. The arm 39 carries at its upper end an inwardly extending stud upon which a grooved roller 41 is journaled and this roller 41 works within the elongated slot 15a of the bar 15 applied to the glass pane 13.

In use, both the window pane 13 and the screen 14 may be raised and lowered without interference one by the other in a manner very similar to the manner that the window pane used in an ordinary non-screen equipped automobile, is operated. The window pane 13 will be raised to extend across the window opening by turning the hand crank 21 in a clockwise direction as viewed in Fig. 1, while the screen 14 may be raised to extend across the window opening by turning the hand crank 20 in a counterclockwise direction as viewed in Fig. 1. When the screen 14 is lowered, it will be disposed inwardly from the arm 39 and it will not strike this arm while being lowered. The spring 28 and the corresponding spring applied to shaft 25 will assist in counterbalancing the weights of the window pane 13 and screen 14. The operating mechanism is exceedingly simple and the installation of the screen, window pane and the operating mechanism therefor is exceedingly easy.

Although the device of the invention is shown as being applied to an automobile door frame, it will be understood that it can equally as well be used in the side panels of automobiles and in many other places. Preferably, spacing cups 42 will be used between the inner panel 9 and the outer ends of the hand cranks 20 and 21.

It will, of course, be understood that various changes may be made in the form, details, arrangement and proportions of the various parts without departing from the scope of the present invention.

What is claimed is:—

A combination screen and window construction for vehicles, comprising a frame having a window opening adjacent its upper end, a window pane slidably mounted in said frame for extension across said window opening and for lowering below said window opening, a window screen slidably mounted in said frame in inwardly spaced relation from said pane for extension across said window opening and for lowering below said window opening, slotted bars secured respectively to the lower edges of the pane and screen, operating cranks mounted in said frame for respectively operating said pane and screen, segment gears pivotally mounted in said frame, pinions carried by said cranks and meshing respectively with said segment gears, sprockets carried by said segment gears, sprocket shafts mounted in said frame below the lowermost positions of said slotted bars, sprockets carried respectively by said shafts, arms carried by said shafts and having portions respectively fitting within the slots of said two bars, one of said arms being spaced outwardly from the other of said arms, to permit both said screen and said pane to be independently raised and lowered without interference one by the other.

In testimony whereof I affix my signature.

CARL W. BUTTERFASS.